(12) United States Patent
Whinnett et al.

(10) Patent No.: US 6,704,572 B1
(45) Date of Patent: Mar. 9, 2004

(54) TIME SHARING OF COMMUNICATIONS RESOURCES IN CELLULAR COMMUNICATIONS SYSTEMS

(75) Inventors: Nicholas Whinnett, Paris (FR); William Robinson, Farnham (FR); Dragan Boscovic, St Germaine en Laye (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/491,194

(22) Filed: Jan. 25, 2000

(30) Foreign Application Priority Data

Mar. 15, 1999 (EP) .............................. 99400628

(51) Int. Cl.[7] ............................................... H04Q 7/20
(52) U.S. Cl. .................... 455/452.1; 455/450; 455/561; 320/431; 320/436
(58) Field of Search ............................... 455/450, 452.2, 455/453, 560, 561, 447, 448; 370/330, 431, 436, 329, 336, 337, 280, 458

(56) References Cited

U.S. PATENT DOCUMENTS 4,670,899 A * 6/1987 Brody et al. ................ 455/453

5,602,836 A * 2/1997 Papadopoulos et al. ...... 370/280
5,761,621 A * 6/1998 Sainton ...................... 455/453
5,809,423 A * 9/1998 Benveniste .............. 455/452.2
5,999,818 A * 12/1999 Gilbert et al. .............. 455/448

FOREIGN PATENT DOCUMENTS

WO   WO 94/28643   * 12/1994   ............ H04B/7/26

* cited by examiner

Primary Examiner—Sonny Trinh

(57) ABSTRACT

An apparatus and method permit a first, fully loaded base station (13) controlled by a first operator to utilize the unused resources of a second base station (15) controlled by a second operator in a time division duplex cellular communications system. The first base station (13) monitors broadcast channel of the second base station (15) and identifies time slots within the time frame structure and at an assigned carrier frequency which are unused by the second base station (15). It then calculates a new time frame structure and sets up a communications link with a subscriber (17) on the assigned carrier frequency during those time slots that avoid contention with the operations of the second base station (15). The invention, advantageously, does not require synchronization of the different operator's base stations (13, 15).

20 Claims, 3 Drawing Sheets

TIME SHARING OF COMMUNICATIONS RESOURCES IN CELLULAR COMMUNICATIONS SYSTEMS

This invention relates to cellular communications systems and particularly to means for sharing resources between communications service operators.

In a cellular communications system, a plurality of base stations provides a radio telecommunications service to a plurality of remote subscriber units. Each base station defines a particular geographical area or "cell" proximate to the base station to produce coverage areas. The communications link from the base station to a subscriber unit is referred to as the down link. Conversely, the communications link from a subscriber unit to the base station is referred to as the uplink.

Multiple access techniques permit the simultaneous transmissions from several subscriber units to a single base station.

One type of multiple access techniques is known as code division multiple access (CDMA), employs spread spectrum signaling. Individual users in the CDMA communications network use the same carrier frequency, but are separated by the use of individual spreading codes. Hence, multiple communications channels are allocated using a plurality of spreading codes within the portion of radio spectrum, each code being uniquely assigned to a subscriber unit.

Another type of multiple access technique is the time division multiple access (TDMA) technique. Further schemes involve combinations of both TDMA and CDMA.

In a TDMA system, a communications channel consists of a time slot in a periodic train of time intervals over the same carrier frequency. Each period of time slots is called a frame. A given signal's energy is confined to one of these slots.

One particular type of TDMA scheme to which the invention is applicable is that known as a time division duplex (TDD) in which the same carrier frequency is used for both uplink and downlink. The repeating time frame is in this case divided into an interval with time slots used in the uplink direction and another interval with time slots used in the downlink direction. The allocation of time slots to either uplink or downlink transmission is controlled by the base station, taking into account the number of subscriber units it is required to support at any given time and this time frame structure is broadcast to each subscriber unit requiring communications services.

FIG. 1 illustrates the concept of this repeating time frame structure. Two repeating frames 1 and 2 are divided into a plurality of time slots 3. During a portion 4 of each frame, the base station is in transmit mode and each mobile subscriber unit is in receive mode. During a portion 5 of each frame, the base station is in receive mode and each subscriber unit is in transmit mode. The point at which the mode of operation changes is called the switching point 6.

In the example of FIG. 1, time slots 7, 8, 9 are allocated for communication with a first subscriber unit and time slots 10, 11, 12 are allocated for communications with a second subscriber unit. More subscriber units can be supported on the same single carrier by utilising the remaining time slots and still further, by employing the CDMA technique previously mentioned.

There is, of course, a finite limit to the number of subscriber units that a single base station can support at any given time and sometimes, the demand can exceed this limit.

Often, similar communications services throughout any given geographical area are provided by more than one communications services operator. An individual user may then choose to subscribe to one of the available operator's services and his subscriber unit is accordingly enabled to communicate only with those base stations under the control of his chosen operator.

As the radio spectrum is finite, each operator is allocated a portion of radio frequency spectrum (allocation often being controlled by some regulatory body).

Say for example, that a first operator has been allocated frequency f1 for use in a TDD communications system and a second operator has been allocated frequency f2 also for use in a TDD communications system. The first and second operators both have base stations installed to support their subscribers in the same geographical area, i.e. their respective cells could be adjacent or even overlap one another. It may be that at any given time, the first operator's base station is fully loaded, whereas the second operator's base station operating in the same area, is under utilised i.e. has some time slots available. In such a case, a subscriber unit subscribing to the first operator and attempting access to the fully loaded base station would be refused a service. It would be beneficial to this subscriber unit if it could use some of the unused resource of the second operator's base station on frequency f2. However, as the subscriber unit in question is not a subscriber to the second operator, he is unable to communicate with the second operator's base station on frequency f2.

This invention aims to provide a means for enabling an under-used resource to be reallocated in order to supplement an overloaded one.

Accordingly, the invention comprises:

A first base station for providing a communications service to at least one subscriber unit, wherein the first base station includes;

Means for receiving information relating to an assigned carrier frequency and an assigned time frame structure comprising a plurality of time slots of a communications resource provided by a second base station;

Means for identifying unused time slots comprising the communications resource; and Means for establishing communication with a subscriber unit during the unused time slots and at the assigned carrier frequency.

Hence, by virtue of the invention, an overloaded base station can utilise the under-used resource of neighbouring base stations which are controlled by other operators. If the first base station identifies an under-utilised second base station, it can use the unoccupied time slots to serve one of its own subscribers. On receiving information concerning the carrier frequency and the time frame structure of the under-utilised resource, it can calculate a new time frame structure including a new switching point, which it can then transmit to the waiting subscriber unit along with the value of the carrier frequency it is to use. Communication is then established between the subscriber unit and the first base station at the assigned carrier frequency associated with the second base station. The first base station also continues to operate on its own previously assigned frequency with its own previously assigned time frame.

The invention has the advantage that it does not require two independent operators to closely synchronise their base stations with each other.

The means for receiving information relating to an assigned carrier frequency and an assigned time frame structure may be adapted to monitor a broadcast channel of the second base station.

The first base station may further include means for determining whether or not a resource from the second base station is available. This may take one of several forms. For example, the first base station may be adapted to receive a dedicated transmission from the second base station notifying it that the second base station is currently under-used. This dedicated transmission may be a radio transmission or one via a hard wired link between the two base stations, for example. Alternatively, the first base station may be pre-programmed to default to a condition whereby if it receives no dedicated transmission from the second base station, then it assumes that a resource is currently available.

Optionally, the first base station may include further means for receiving a message from the second base station when a previously available resource no longer becomes available for its own use.

Preferably, the first base station is adapted to constantly monitor the activities of the second base station, for example, by monitoring the broadcast channel, so that it can detect when communications with additional subscriber units are set up by the second base station. This then enables the first base station to reorganise its new time frame structure in order to avoid contention with the additional subscriber units.

Optionally, the invention further provides a plurality of fail safe modes of operation for ensuring that if the second base station requires the time slots which are currently being used by the first base station, then these time slots are relinquished by the first base station.

One way of doing this is for the first base station to detect (by monitoring the second base station's broadcast channel, for example) that such time slots have been reassigned to a user communicating with the second base station i.e. that the frame structure has changed. On detecting this, the first base station is adapted to either curtail its communication with the subscriber unit communicating on those time slots or to reassign that subscriber unit to some other time slots or some other available resource. An alternative provides for reception at the first base station of a dedicated transmission from the second base station informing the first base station that certain or all time slots are no longer available.

In order to accommodate instances where an error exists such that the broadcast channel of the second base station is not received by the first base station, the first base station may be provided with further means for reacting to this loss of reception by curtailing its use of the second base station's resource.

The first base station may, optionally, be provided with means for transmitting information relating to an assigned frequency and an assigned time frame structure of its own communications resource which could be made available to a third base station. It may also, optionally, be provided with means for indicating to a third base station whether or not it has any resource available. Further, it may be provided with means for indicating to a third base station when a resource is no longer available.

Potential interference problems which can arise when two proximate base stations are operating on the same frequency can be overcome by a further optional feature of the invention.

Say, for example, that the first base station has identified some available time slots on a carrier frequency f2 that has been allocated to the second base station. In accordance with the invention, the first base station sets up a communications link with a subscriber unit on frequency f2. However, suppose that the subscriber unit is located close enough to the second base station such that the second base station (in addition to the first base station) can detect its transmissions. Note that the second base station may equally well be able to detect the first base station transmissions on frequency f2 if they are close enough together. If the edges of the time slots of the first base station's new frame structure exactly coincide with those of the frame structure assigned to the second base station, then there will be no interference because the second base station will not be listening while the subscriber unit is transmitting (and vice versa). However, because of the propagation delay of the broadcast channel from the second base station which is picked up by the first base station, the first base station cannot precisely compute the edges of the time slots of the frame structure assigned to the second base station. Therefore, there is the possibility of overlap occurring between edges of the second base station's time slots and those of the first base station's time slots within its new frame structure. Hence there is a mechanism for interference to occur. This problem is most likely to occur when the first base station is attempting to use all rather than a few of the unused time slots.

If the first base station knows exactly what the propagation delay is, then it can of course make the necessary adjustment to the time slots.

If it does not know the propagation delay, the invention overcomes this problem by providing in the first base station a means for setting a guard period between time slots.

Preferably, guard periods are set between two adjacent slots where one slot is to be used by the first base station and the second slot is being used by the second base station.

The length of the guard period depends on the propagation delay. This can be roughly estimated by the first base station if it knows the size of its neighbour's cell. For example, the guard period for a picocell system could be set to be considerably a shorter period than that for the case of a macro cell systems.

To reduce the likelihood of transmissions between the first base station and a subscriber unit on carrier frequency f2 interfering with transmissions between the second base station and one of its own subscribers on f2, it is preferable for those time slots utilised by the first base station and contiguous with time slots being used by the second base station to the assigned similarly, i.e. pairs of contiguous slots to be both either uplink slots or downlink slots.

Therefore, further optional means are provided in the first base station for determining whether an unused time-slot is to be set to uplink or downlink transmission, depending upon the assigned time frame structure of the second base station, and setting the unused time slot accordingly.

Hence the first base station can still handle traffic having varying degrees of uplink/downlink asymmetry without causing significant interference problems to the second base station.

To free up as many time slots as possible in an under-utilised base station for an overloaded base station to use, the invention provides a further option whereby means are provided in the first base station (which for the purposes of the following explanation is to be regarded as the under-utilised base station) to cluster used time slots around the switching point rather than spreading them throughout the frame. This ensures that there is a large period of contiguous unused time slots for the overloaded base station to allocate to one or more subscriber units. Having one large period like this makes management of the communications link with one or more subscriber units easier. It also means that fewer guard periods are required for insertion.

A further way of lightening the load of an under-utilised base station on the uplink and one which is particularly useful for CDMA-TDD systems is as follows. It is usual for a subscriber using a medium data rate service to be allocated all available slots per frame and to use a single code transmission method. (This is done in order to avoid large peak to average ratio of the signal transmitted by the subscriber unit (which necessitates an inefficient operation of the transmitter power amplifier in the subscriber unit and a subsequent drain on the battery). In order to free up some uplink slots without incurring large peak to average penalty, the invention provides further optional means in the first base station for instructing the subscriber unit to use transmission with a reduced spreading factor on fewer time slots and means for receiving such transmissions. However, using a lower spreading factor alone increases the bit rate used per slot and hence increases the granularity of available bit rates. Therefore, to reduce the granularity of available bit rates, the first base station optionally provides further means for instructing the subscriber unit to transmit certain time slots every other frame instead of every frame. This principle may be taken further by transmitting certain time slots every "N" frames (where "N" is an integer of the operator's choice). Alternatively, the granularity of available bit rates can be reduced by allowing a lower spreading factor over a sub-set (instead of all) slots used by the subscriber unit for transmission. The same principles can be applied to transmissions from the first base station thereby freeing up slots on the downlink also. However, the peak to average disparity is less of a problem for the base station. This option lends itself to transmissions which will not suffer unduly from delays, such as information downloading from an Internet site, for example.

A further optional feature of the invention provides means at the first base station for clustering those time slots which have been made available by the second base station and which have been assigned by the first base station for its own subscriber's use, around its new calculated switching point. This is advantageous because re-allocation of time slots after the second base station has re-adjusted its own frame structure is more readily accommodated.

A further preferred feature provides means in the first (overloaded) base station for assigning its new switching point to a position within the second (under-utilised) base station's time frame which is far removed from the second base station's own switching point. This feature coupled with the feature in an under-loaded base station for clustering its used time slots around its switching point, reduces the likelihood of the overloaded base station having to re-allocate time slots or even discontinue an existing connection when additional users connect with the under-utilised base station.

It will be appreciated by those skilled in the art that the invention lends itself especially to communications services which are tolerant to delays in transmission/receipt such as downloading E-Mail messages or Internet/Web browsing.

Some embodiments of the invention will now be described, by way of example only, with reference to the drawings of which;

Figure 2:
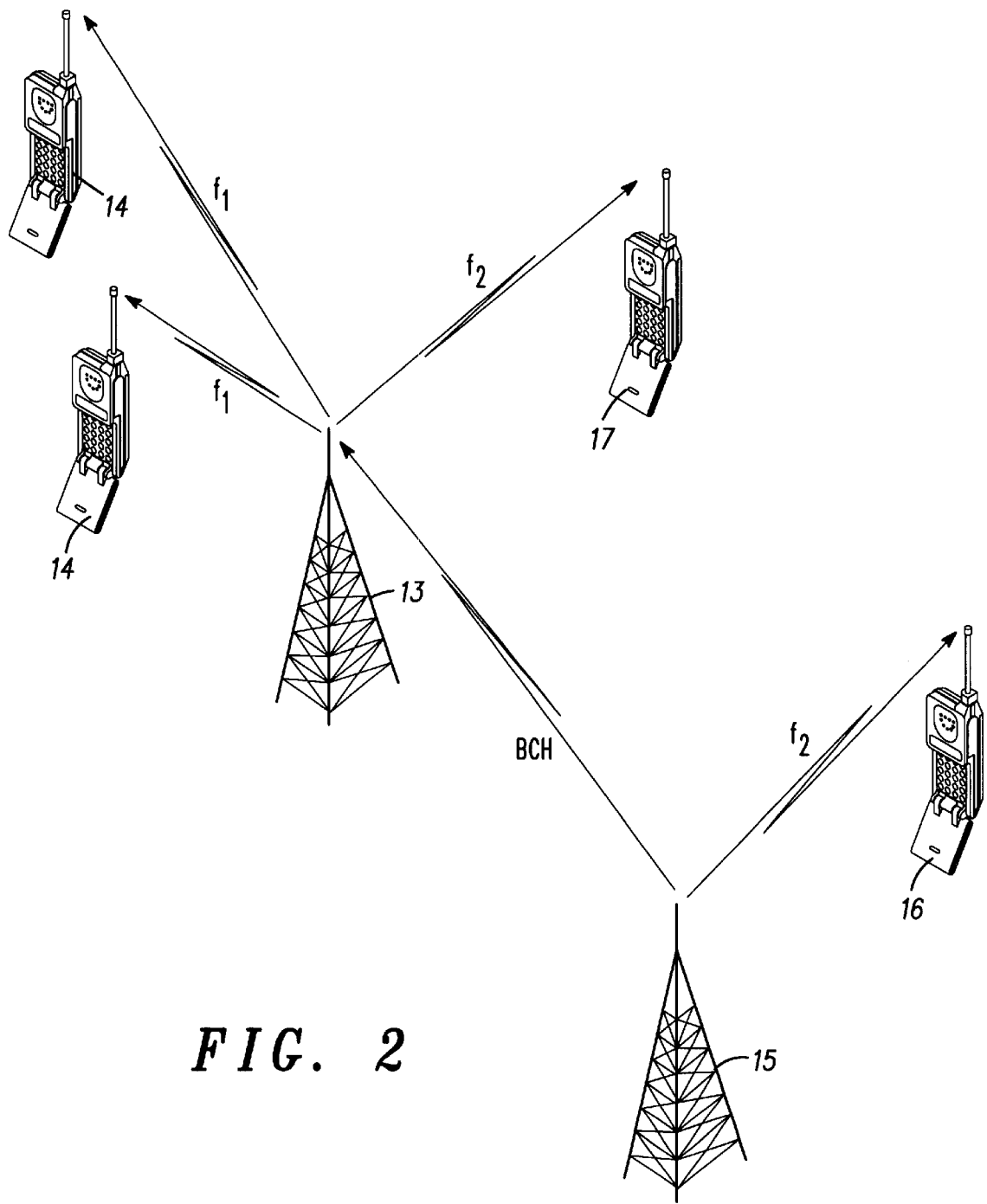
FIG. 2 is a schematic diagram of a communications system employing a base station in accordance with the invention.

In FIG. 2, a first base station 13 supports a communications service for a plurality of mobile subscriber units 14 (just two being shown for the sake of clarity) over a carrier frequency f1.

A second neighbouring base station 15 operated by a different service operator to that operating the first base station 13, supports a call with a single mobile subscriber unit 16 over a carrier frequency f2. It also transmits a broadcast channel (BCH) which the first base station 13 can receive.

In this example, all time slots in the first base stations assigned time frame are being utilised, whereas only a few of the second base station's time slots are being used (specifically by the mobile subscriber unit 16 only).

Suppose that a further mobile subscriber unit 17, which subscribes to the service provided by the operator of the first base station 13, requests a service from the first base station 13. The first base station 13 cannot provide a service on carrier frequency f1 because all its time slots are full. Therefore, it sets up a link with the new mobile subscriber unit 17 on carrier frequency f2 during those time slots that are not being used by the second base station 15.

Figure 3:
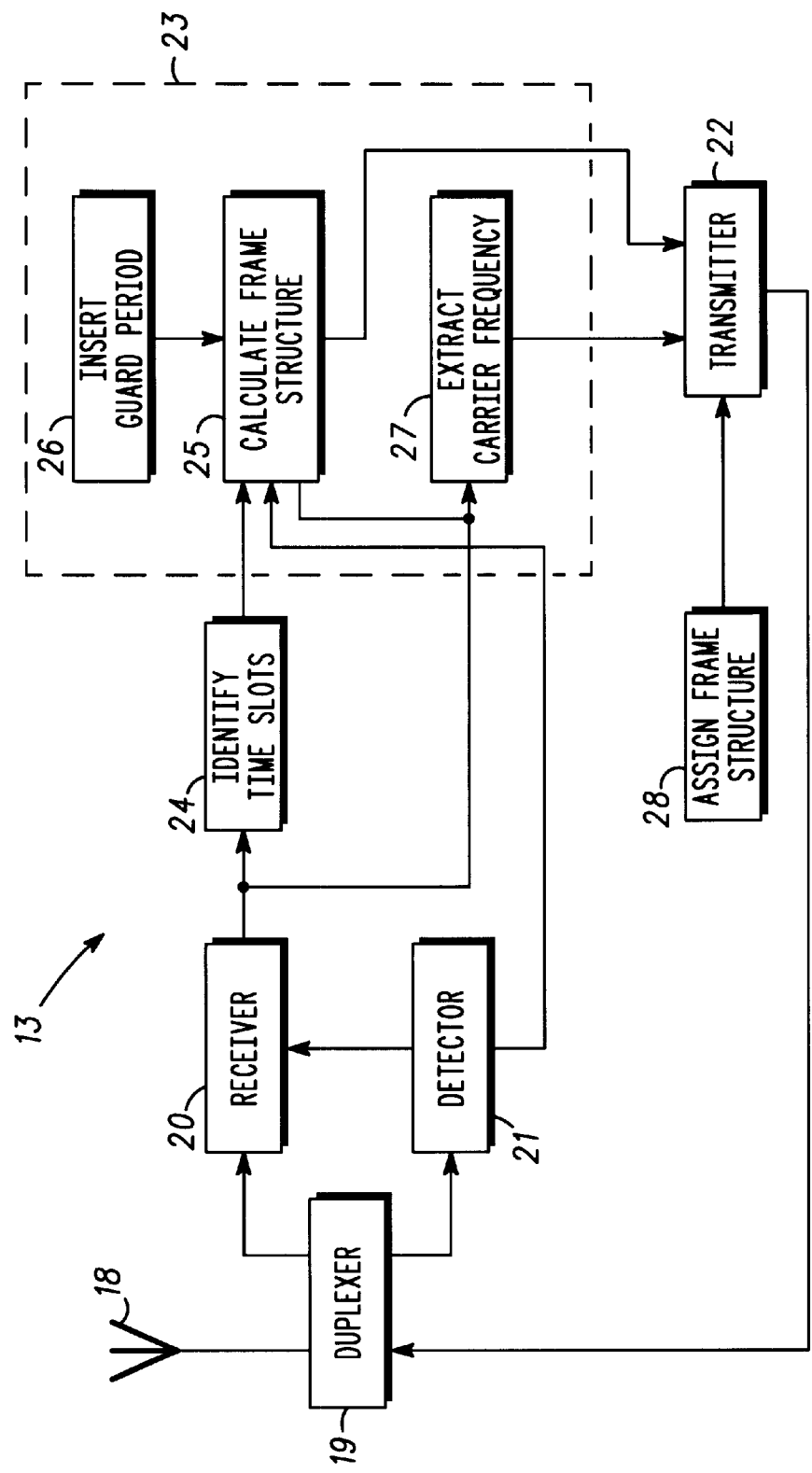
FIG. 3 is a schematic block diagram of a base station in accordance with the invention.

With reference to FIG. 3, a base station 13 comprises an antenna 18 for the reception and transmission of communications signals between the base station 13 and a mobile subscriber unit. The output of the antenna 18 is connected via a duplexer 19 to a receiver 20 and a detector 21 and a transmitter 22. An output of the detector 21 is fed to a first input of a processing module 23, and a second output is connected to the receiver 20. An output of the receiver 20 is fed to a time slot identify module 24 and a second input of the processing module 23. An output of the time slot identify module 24 is fed to a third input of the processing module 23.

The processing module 23 comprises 3 sub-modules. A first sub-module 25 is adapted to calculate a time frame structure and switching point and receives inputs from a second sub-module 26 which inserts a guard period into a calculated frame structure and from the detector 21. An output of the first module 25 is fed to the transmitter 22. A third sub-module 27 which comprises the processing module 23, extracts a carrier frequency from the receiver's output and feeds it to the transmitter 22.

The base station 13 also comprises a module 28 for assigning a frame structure to transmissions from the base station 13 via the transmitter 22.

All the components illustrated in FIG. 3 can be realised using conventional radio and software engineering techniques.

The operation of the base station 13 of FIG. 3 is as follows. Base station 13 has been assigned frequency f1 as its carrier frequency for all communication with its subscribers 14. It is adapted to operate in TDD mode and the module 28 assigns an appropriate time frame structure and switching point. It communicates this structure and switching point to its subscriber's mobile subscriber units 14 via the transmitter 22, duplexer 19 and an antenna 18 on a broadcast channel. In this example, the module 28 is also configured to cluster used time slots around the switching point for the reasons described above. Also in this example, the module 28 is adapted to configure the time frame structure so that its subscriber units 14 transmit on certain time slots with reduced spreading factor every N time frames in instances where a delay in transmission can be tolerated. The broadcast channel transmitted via the transmitter 22 can also be used as an indication to other base stations of available resource assigned to the base station 13 and currently not in use. Alternatively, a dedicated signal from the transmitter 22 performs this function.

Say that at a certain point in time, the base station's 13 resources on frequency f1 are fully utilised i.e. all its time slots are full, yet an additional mobile subscriber unit 17 is requesting a service.

Figure 1:
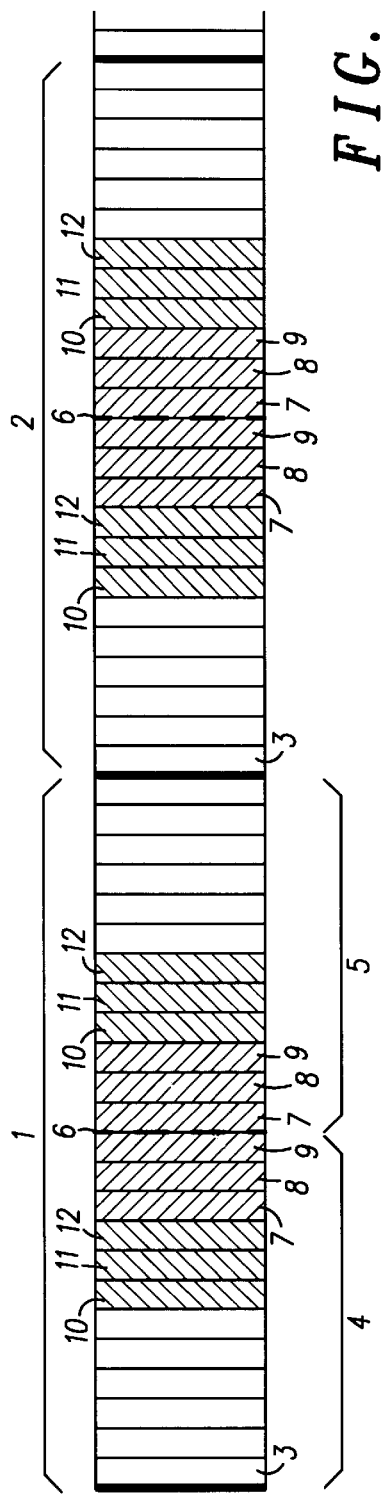
FIG. 1 is a diagram illustrating a timing frame structure of a TDD Communications system to which the invention is applicable.
Figure 4A:
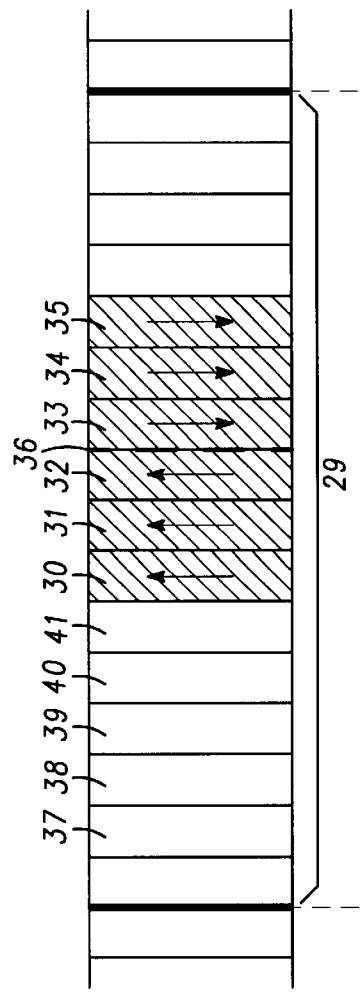
FIG. 4A is a diagram illustrating a timing frame structure received by the base station of FIG. 3.

Neighbouring base station 15, transmitting and receiving on carrier frequency f2, is under-utilised and has some available time slots (see FIG. 4A).

Within the frame 29 of FIG. 4A only time slots 30 to 32 and 33 to 35 either side of the switching point 36, are occupied. Slots 30 to 32 are uplink slots and slots 33 to 35 are downlink slots.

The detector 21 in the base station 13 monitors transmission from the neighbouring base station 15 and detects a signal informing it that resource is available. It then triggers the receiver 20 to listen for the broadcast channel of the neighbouring base station 15 to ascertain the carrier frequency and frame structure of the neighbouring base station's transmissions. (In an alternative embodiment, the dectector 21 is set to a default mode so that if it does not receive a pre-determined signal from the neighbouring base station 15, it assumes that resource is available and notifies the receiver 20 accordingly).

On receiving the broadcast channel from the neighbouring base station 15 via the receiver 20, the module 24 identifies those time slots in the neighbouring base station's frame structure which are unused (i.e. those slots having no hatching in FIG. 4A, for example, 37 to 41).

Knowing the time frame structure and which slots are available, the sub-module 25 then calculates the new frame structure and switching point for a communications link with the new mobile subscriber unit 17 on frequency f2.

The module 26 inserts a guard period into the frame structure based on a stored estimation of neighbouring cell size which is related to the propagation delay time between the two base stations 13 and 15.

The calculated frame structure with its constituent time slots is then transmitted to the mobile subscriber unit 17 via the transmitter 22 along with the value of the carrier frequency to use (f2) which has been determined by the sub-module 27.

Figure 4B:
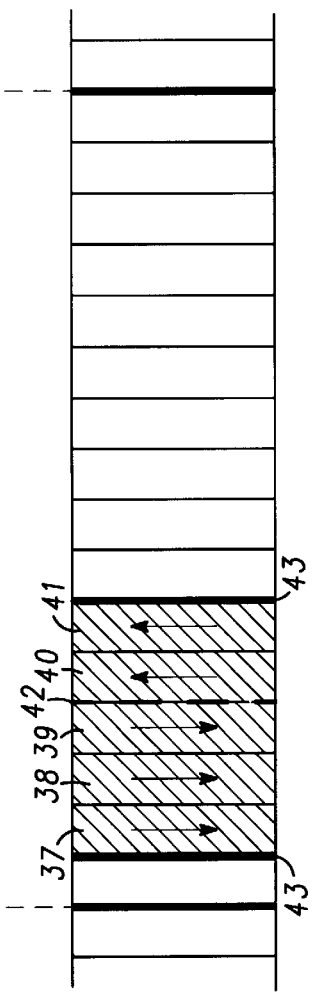
FIG. 4B is a diagram illustrating a timing frame structure generated by the base station of FIG. 3.

FIG. 4B shows how the calculated frame structure is configured in this example. The module 25 has arranged to cluster the borrowed time slots 37 to 41 around a calculated switching point 42 and has set the switching point 42 well away from the neighbouring base station's assigned switching point 36.

The module 25 is also configured to allocate those slots which are contiguous with downlink slots used by the second base station to also be downlink slots and to allocate those slots which are contiguous with uplink slots used by the second base station to be uplink slots.

A guard period 43 has been inserted at the edges of both slots (37 and 41) closest to the points of activity of the neighbouring base station 15. Slot 41, which is contiguous with an uplink slot 30 of the neighbouring base station 15, has been designated as an uplink slot.

When more time slots on frequency f2 are taken for use by the neighbouring base station 15, this will be evident to the base station 13 by virtue of its broadcast channel monitoring operation. In response to this, the sub-module 25 reconfigures its frame structure and switching point in order to avoid contention with the neighbouring base station 15 transmissions.

When the neighbouring base station's 15 resources cease to become available to the base station 13, a transmission signaling this state is received by the detector 21 and in response to this informs the sub-module 25 which in turn curtails communication on frequency f2 with the mobile subscriber unit 17.

We claim:

1. A first base station for providing a communications service to at least one subscriber wherein said first base station includes;
   means for receiving information relating to an assigned carrier frequency and an assigned time frame structure comprising a plurality of time slots of a communications resource provided by a second base station,
   means for identifying unused time slots comprising the communications resource, and
   means for establishing communication with a subscriber unit during the unused time slots and at the assigned carrier frequency.

2. A first base station according to claim 1 in which the means for receiving information relating to an assigned carrier frequency and an assigned time frame structure of the second base station is adapted to monitor a broadcast channel of the second base station.

3. A first base station according to claim 1 and further including means for detecting whether or not a resource from the second base station is available.

4. A first base station according to claim 3 in which the means for determining whether or not a resource from the second base station is available is adapted to receive a dedicated transmission from the second base station.

5. A first base station according to claim 3 in which the means for determining whether or not a resource from the second base station is available is adapted to set a default mode when no dedicated transmission from the second base station is received.

6. A first base station according to claim 1 and further including means for receiving notification that a previously available resource is no longer available.

7. A first base station according to claim 1 in which the means for establishing communication with a subscriber unit during the unused time slots includes means for calculating a new time frame structure.

8. A first base station according to claim 7 in which the means for calculating a new frame structure further includes means for inserting a new switching point into the new frame structure.

9. A first base station according to claim 8 in which the means for calculating a new time frame structure is adapted to cluster used time slots around the new calculated switching point.

10. A first base station according to claim 8 in which the means for calculating a new tune frame structure is adapted to determine whether an unused time slot is to be set to uplink or downlink transmission depending upon the assigned time frame structure of the second base station and setting the unused time slot accordingly.

11. A base station according to claim 8 in which the means for calculating a new time frame structure is adapted to position the new switching point away from a switching point associated with an assigned time frame structure of the second base station.

12. A first base station according to claim 7 in which the means for establishing communication with a subscriber unit during the unused time slots is adapted to modify the calculated new frame structure in response to a signal transmitted by the second base station.

13. A first base station according to claim 7 in which the means for establishing communication with a subscriber unit during the unused time slots is adapted to modify the calculated new frame structure in response to failure to receive a broadcast channel of the second base station.

14. A first base station according to claim 7 in which the means for calculating a new time frame structure includes means for inserting guard periods between time slots.

15. A first base station according to claim 1 in which the means for establishing communication with a subscriber unit during the unused time slots is adapted to curtail communication with a subscriber unit in response to failure to receive a broadcast channel of the second base station.

16. A first base station according to claim 1 and further including means for transmitting to a third base station information relating to an available resource of the first base station.

17. A first base station according to claim 1 and having assigned thereto a time frame structure of assigned time slots comprising repeating time frames and an associated switching point and further including means for clustering used time slots around the associated switching point.

18. A first base station according to claim 17 and having means for configuring the time frame structure to support communication with a subscriber unit every N time frames where N is an integer greater than or equal to 2.

19. A method of sharing resources between communications service operators in a cellular communications system including the steps of:

in a first base station, receiving information relating to an assigned carrier frequency and an assigned time frame structure comprising a plurality of time slots of a communications resource provided by a second base station, identifying unused time slots comprising the communications resource, and establishing a communication with a subscriber unit during the unused time slots and at the assigned carrier frequency.

20. A method according to claim 19 and further including the steps of;

in the first base station, transmitting to a third base station information relating to an assigned carrier frequency and an assigned time frame structure of a communications resource provided by the first base station.

* * * * *